United States Patent
Engle et al.

(10) Patent No.: US 10,739,150 B2
(45) Date of Patent: Aug. 11, 2020

(54) INTERACTIVE ROUTING INFORMATION BETWEEN USERS

(71) Applicant: GM GLOBAL TECHNOLOGY OPERATIONS LLC, Detroit, MI (US)

(72) Inventors: Stephanie Olivia Engle, San Francisco, CA (US); Mariya Jacobo, San Francisco, CA (US); Bradley David Ryan, San Francisco, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 3 days.

(21) Appl. No.: 16/106,794

(22) Filed: Aug. 21, 2018

(65) Prior Publication Data
US 2020/0064143 A1 Feb. 27, 2020

(51) Int. Cl.
*G01C 21/34* (2006.01)
*G06Q 50/30* (2012.01)
(Continued)

(52) U.S. Cl.
CPC ..... *G01C 21/3438* (2013.01); *G01C 21/3484* (2013.01); *G05D 1/0088* (2013.01);
(Continued)

(58) Field of Classification Search
CPC .... G06Q 10/025; G06Q 10/047; G06Q 50/30; G08G 1/202; G01C 21/3415;
(Continued)

(56) References Cited

U.S. PATENT DOCUMENTS 6,298,304 B1 10/2001 Theimer
9,651,391 B1 * 5/2017 Hayes ................ G01C 21/3438
(Continued)

FOREIGN PATENT DOCUMENTS

JP 2015200933 A * 11/2015

OTHER PUBLICATIONS

Gidofalvi, Gyozo et al., "Instant social ride-sharing", 15th World Congress on Intelligent Transport Systems and ITS America's 2008 Annual Meeting, New York NY, United States, Date: Nov. 16, 2008 to Nov. 20, 2008, 8 pages (Year: 2008).*

*Primary Examiner* — Faris S Almatrahi
*Assistant Examiner* — David A Testardi
(74) *Attorney, Agent, or Firm* — Medley, Behrens & Lewis, LLC

(57) ABSTRACT

A method, autonomous system controller, and computer program product generate a first route for an autonomous vehicle to transport a first person from a first location to a destination. In response to determining that a second person satisfies trigger criteria comprising: (i) being at a second location that is within a proximity threshold to the first route; (ii) being associated with the first person; and (iii) being associated with the destination, an affordance is caused to be presented via respective user interface devices to at least one of the first and second persons that proposes that the autonomous vehicle transport both the first and second persons to the destination. In response to receiving acceptance, a second route is generated for the autonomous vehicle that comprises picking up the first person at the first location, picking up the second person at the second location, and transporting both persons to the destination.

20 Claims, 9 Drawing Sheets

(51) Int. Cl.
*G05D 1/02* (2020.01)
*H04W 4/40* (2018.01)
*H04W 4/024* (2018.01)
*G06Q 50/00* (2012.01)
*G06Q 30/02* (2012.01)
*G05D 1/00* (2006.01)

(52) U.S. Cl.
CPC ....... *G05D 1/0274* (2013.01); *G06Q 30/0284* (2013.01); *G06Q 50/01* (2013.01); *G06Q 50/30* (2013.01); *H04W 4/024* (2018.02); *H04W 4/40* (2018.02); *G05D 2201/0212* (2013.01)

(58) Field of Classification Search
CPC .............. G01C 21/343; G01C 21/3438; G05D 1/0088; G05D 2201/0212; G05D 2201/0213
See application file for complete search history.

(56) References Cited

U.S. PATENT DOCUMENTS

| | | | |
|---|---|---|---|
| 9,755,850 B2 | 9/2017 | Stolfus | |
| 10,147,325 B1* | 12/2018 | Copeland | G08G 1/202 |
| 10,156,449 B2 | 12/2018 | Colijn et al. | |
| 2008/0091342 A1* | 4/2008 | Assael | G01C 21/3438 701/533 |
| 2010/0070168 A1 | 3/2010 | Sumcad et al. | |
| 2011/0145089 A1* | 6/2011 | Khunger | G01C 21/3438 705/26.4 |
| 2012/0271500 A1 | 10/2012 | Tsimhoni et al. | |
| 2013/0054139 A1* | 2/2013 | Bodin | G06Q 10/00 701/468 |
| 2014/0082069 A1* | 3/2014 | Varoglu | G06Q 50/01 709/204 |
| 2015/0248689 A1* | 9/2015 | Paul | G06Q 30/0222 705/14.23 |
| 2015/0323335 A1* | 11/2015 | Lord | G06Q 10/063114 705/7.15 |
| 2015/0324718 A1* | 11/2015 | Lord | G06Q 50/30 705/7.13 |
| 2015/0324729 A1* | 11/2015 | Lord | G06Q 10/06 705/7.15 |
| 2015/0338852 A1* | 11/2015 | Ramanujam | G01C 21/26 701/2 |
| 2016/0034845 A1* | 2/2016 | Hiyama | G06Q 10/08 705/7.15 |
| 2016/0171637 A1* | 6/2016 | Rai | H04L 67/12 705/13 |
| 2016/0189098 A1* | 6/2016 | Beaurepaire | G06Q 10/0835 705/337 |
| 2016/0342946 A1* | 11/2016 | Herraiz Herraiz | G06Q 10/08 |
| 2016/0364678 A1* | 12/2016 | Cao | G06Q 50/30 |
| 2017/0003687 A1 | 1/2017 | Kojo et al. | |
| 2017/0059336 A1* | 3/2017 | Huang | G01C 21/34 |
| 2017/0113687 A1* | 4/2017 | Gordon | B60W 30/165 |
| 2017/0123422 A1* | 5/2017 | Kentley | B60H 1/00735 |
| 2017/0167882 A1* | 6/2017 | Ulloa Paredes | G01C 21/3446 |
| 2017/0169366 A1* | 6/2017 | Klein | G06Q 10/02 |
| 2017/0213165 A1* | 7/2017 | Stauffer | G06Q 10/02 |
| 2017/0284820 A1* | 10/2017 | Dryjanski | G01C 21/343 |
| 2017/0316516 A1* | 11/2017 | Goldman-Shenhar | G06Q 50/01 |
| 2017/0349184 A1* | 12/2017 | Tzirkel-Hancock | B60W 50/08 |
| 2018/0053277 A1* | 2/2018 | Huang | G06Q 50/30 |
| 2018/0172459 A1* | 6/2018 | Mazzella | G06Q 10/04 |
| 2018/0209803 A1* | 7/2018 | Rakah | G08G 1/096844 |
| 2018/0211541 A1* | 7/2018 | Rakah | G08G 1/096844 |
| 2018/0293687 A1* | 10/2018 | Hardee | G06Q 50/30 |
| 2018/0356239 A1* | 12/2018 | Marco | G01C 21/3611 |
| 2019/0050787 A1* | 2/2019 | Munafo | G06N 20/00 |
| 2019/0137290 A1* | 5/2019 | Levy | G05D 1/0214 |
| 2019/0228367 A1* | 7/2019 | Longo | G06Q 50/30 |
| 2019/0244042 A1* | 8/2019 | Yang | G05D 1/0088 |

* cited by examiner

INTERACTIVE ROUTING INFORMATION BETWEEN USERS

BACKGROUND

The present application generally relates to autonomously driven passenger vehicles and more particularly relates to automatic route generation for taxi services provided by autonomously driven passenger vehicles.

Significant development has occurred in geographic mapping and navigation systems. Various routing algorithms have been devised for determining a route between a starting point and a destination that dynamically achieve a fastest or shortest route, for example. Building upon this enabling navigation technology, mobile-based business platforms have been implemented that enable automated passenger and parcel taxi services. The business platform selects particular vehicles and potential drivers based on routing proximity and availability. The business platform handles fare negotiations between driver and passenger in some instances. Other systems arrange delivery of food or other goods.

While being effective, generally-known routing systems are constrained to deliver point-to-point transportation in response to a user query. The process begins with the user who wishes to be a passenger or to have goods delivered. The user provides pickup and delivery locations and arranges who or what is to be transported. The routing system may suggest a location such as home or work based on a historical user data. However, this is a very limited number of locations to propose to a user due to limits on direct knowledge of the user's own preferences or habits.

SUMMARY

The following is a brief summary of subject matter that is described in greater detail herein. This summary is not intended to be limiting as to the scope of the claims. The present innovation is directed at least in part to socializing routing of autonomous vehicle transportation based on associations between potential passengers and their corresponding preferences and destinations that are shared as a group.

In accordance with one aspect of the present innovation, a method includes generating a first route for an autonomous vehicle to transport a first person from a first location to a destination. The method includes determining whether a second person satisfies trigger criteria comprising: (i) being at a second location that is within a proximity threshold to the first route; (ii) being associated with the first person; and (iii) being associated with the destination. In response to determining that the trigger criteria are satisfied, the method includes causing presentation of an affordance via a respective user interface device to at least one of the first and second persons that proposes that the autonomous vehicle transport both the first and second persons to the destination. In response to receiving acceptance of the affordance from the at least one of the first and second persons via the respective user interface device, the method includes generating a second route for the autonomous vehicle that comprises picking up the first person at the first location, picking up the second person at the second location, and transporting both the first and second persons to the destination.

In one aspect of the present disclosure, an autonomous system controller includes a communication interface that is in communication with: (i) an autonomous vehicle; (ii) a first user interface device that is used by a first person; (iii) and a second user interface device that is used by a second person. The controller includes a routing system that is in communication with the communication interface. The routing system generates a first route for the autonomous vehicle to transport the first person from a first location to a destination. The routing system determines whether the second person satisfies trigger criteria comprising: (i) being at a second location that is within a proximity threshold to the first route; (ii) being associated with the first person; and (iii) being associated with the destination. In response to determining that the trigger criteria are satisfied, the routing system causes presentation of an affordance via the respective user interface device to at least one of the first and second persons that proposes that the autonomous vehicle transport both the first and second persons to the destination. In response to receiving acceptance of the affordance from the at least one of the first and second persons via the respective user interface device, the routing system generates a second route for the autonomous vehicle that comprises picking up the first person at the first location, picking up the second person at the second location, and transporting both the first and second persons to the destination.

In one aspect according to the present disclosure, a computer program product includes program code on a computer readable storage device that, when executed by a processor associated with an electronic device, the program code enables the electronic device to provide the functionality of generating a first route for an autonomous vehicle to transport a first person from a first location to a destination. The program code determines whether a second person satisfies trigger criteria comprising: (i) being at a second location that is within a proximity threshold to the first route; (ii) being associated with the first person; and (iii) being associated with the destination. In response to determining that the trigger criteria are satisfied, the program code causes presentation of an affordance via a respective user interface device to at least one of the first and second persons that proposes that the autonomous vehicle transport both the first and second persons to the destination. In response to receiving acceptance of the affordance from the at least one of the first and second persons via the respective user interface device, the program code generates a second route for the autonomous vehicle that comprises picking up the first person at the first location, picking up the second person at the second location, and transporting both the first and second persons to the destination.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
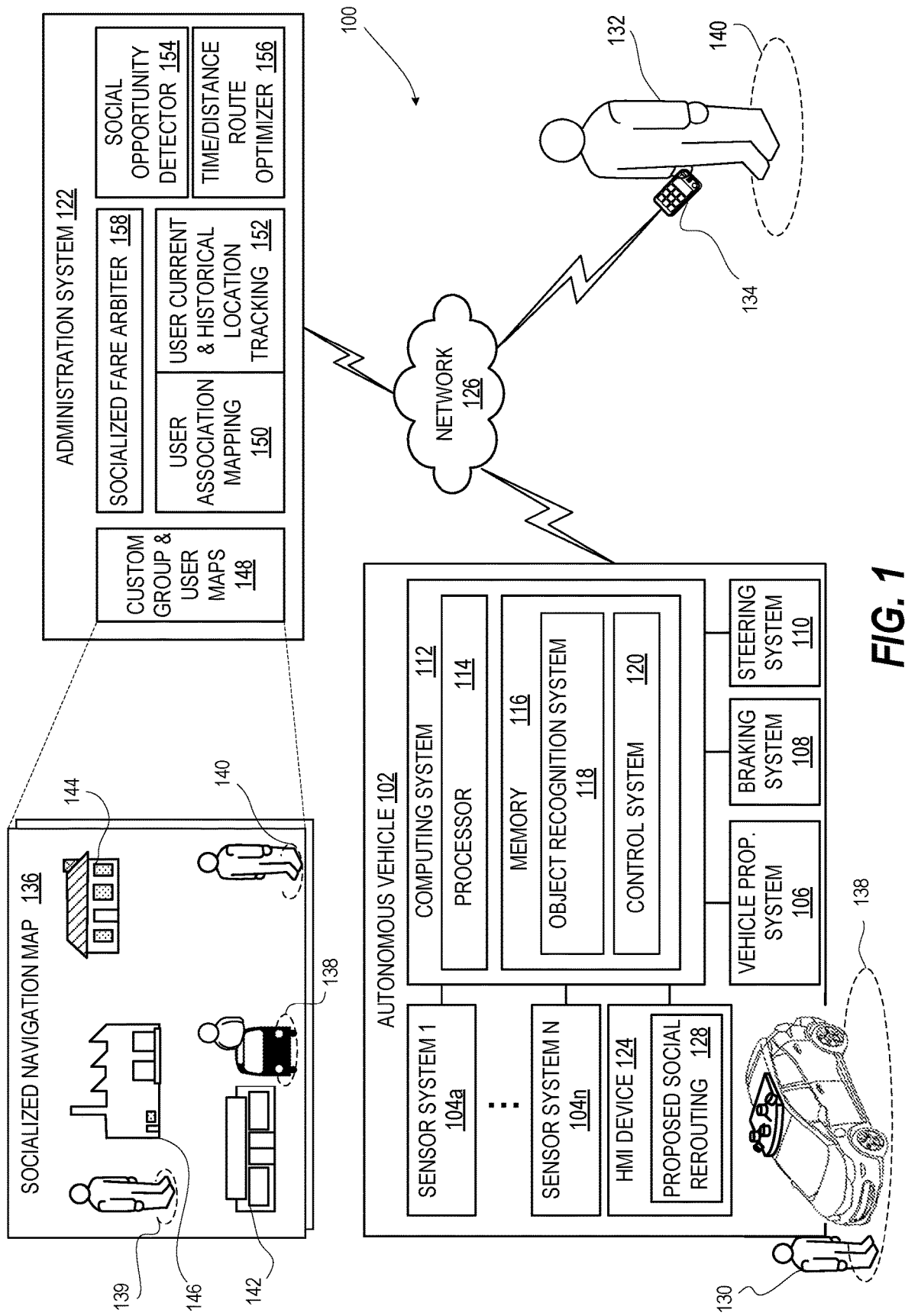
FIG. 1 is a functional block diagram that illustrates an exemplary autonomous vehicle system that facilitates socialized ride sharing, according to one or more embodiments.

A method, autonomous system controller, and computer program product generate a first route for an autonomous vehicle to transport a first person from a first location to a destination. In response to determining that a second person satisfies trigger criteria comprising: (i) being at a second location that is within a proximity threshold to the first route; (ii) being associated with the first person; and (iii) being associated with the destination, an affordance is caused to be present via a respective user interface device to at least one of the first and second persons that proposes that the autonomous vehicle transport both the first and second persons to the destination. In response to receiving acceptance, a second route is generated for the autonomous vehicle that comprises picking up the first person at the first location, picking up the second person at the second location, and transporting both persons to the destination.

As set forth herein, like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With reference now to FIG. 1, an exemplary autonomous vehicle system 100 that provides routing for one or more autonomous vehicles 102 is illustrated. The autonomous vehicle 102 can navigate about roadways without human conduction based upon sensor signals output by sensor systems of the autonomous vehicle 102. The autonomous vehicle 102 includes a plurality of sensor systems 104a-n (a first sensor system 104a through an Nth sensor system 104n). The sensor systems 104a-n are of different types and are arranged about the autonomous vehicle 102. For example, the first sensor system 104a may be a lidar sensor system and the Nth sensor system 104n may be a camera (image) system. Other exemplary sensor systems include radar sensor systems, GPS sensor systems, sonar sensor systems, infrared sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 106, a braking system 108, and a steering system 110. The vehicle propulsion system 106 may be an electric motor, an internal combustion engine, or a combination thereof. The braking system 108 can include an engine break, brake pads, actuators, and/or any other suitable componentry that is configured to assist in decelerating the autonomous vehicle 102. The steering system 110 includes suitable componentry that is configured to control the direction of movement of the autonomous vehicle 102.

The autonomous vehicle 102 additionally comprises a computing system 112 that is in communication with the sensor systems 104a-n and is further in communication with the vehicle propulsion system 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 comprises an object recognition system 118 that is configured to assign labels to objects (in proximity to the autonomous vehicle 102) captured in sensor signals output by the sensor systems 104a-n.

The memory 118 additionally includes a control system 120 that is configured to receive output of the object recognition system 118 to adjust a route received from an administration system 122 and is further configured to control at least one of the mechanical systems (the vehicle propulsion system 106, the brake system 108, and/or the steering system 110) based upon the output of the object recognition system 118.

The autonomous vehicle 102 includes a human-machine interface (HMI) 124 to provide information and to receive certain user inputs. For example, the administration system 122 can relay via a network 126 an opportunity as a proposed social rerouting affordance 128 for a ride share to a first person 130 that is a passenger of the autonomous vehicle 102. In one embodiment, the administration system 122 detects the opportunity and causes the opportunity to be presented to a second person 132 via a user interface device 134. The opportunity can be presented as a socialized navigation map 136 that is relevant to both first and second persons 130, 132. For example, both persons 130, 132 can be associated as being friends, co-workers, or members of the same club or organization. The socialized navigation map 136 can be annotated with current locations 138-140 of members of the group. One of these indications can include the current location 138 of the first person 130 in the autonomous vehicle 102 going to a destination, such as a social venue or store 142, a residence 144 or an employment site 146.

In one or more embodiments, the administration system 122 provides a social networking service as well as provides a taxi service using a fleet of autonomous vehicles 102. The administration system 122 maintains a custom group and user maps database 148 that contains flagged or detected locations. A user association mapping data structure 150 can contain associations and sharing permissions for a population of users of trusted or affiliated persons. A user current and historical location tracking data structure 152 can include locations designated of interest to particular users and groups of users, and historically frequented sites by the particular users and groups of users. A social opportunity detector agent 154 can utilize a rule-based or inferential engine to analyze the current data and associations to identify opportunities. Whether a socialized route or a direct point-to-point route, a time/distance route optimizer 156 can optimize routes sent to autonomous vehicles 102. Based on the time and distance and the number of passengers, a socialized fare arbiter 158 can facilitate setting fixed or negotiable rates that are affected by time, distance, number of passengers, and current supply and demand for taxi services.

Figure 2:
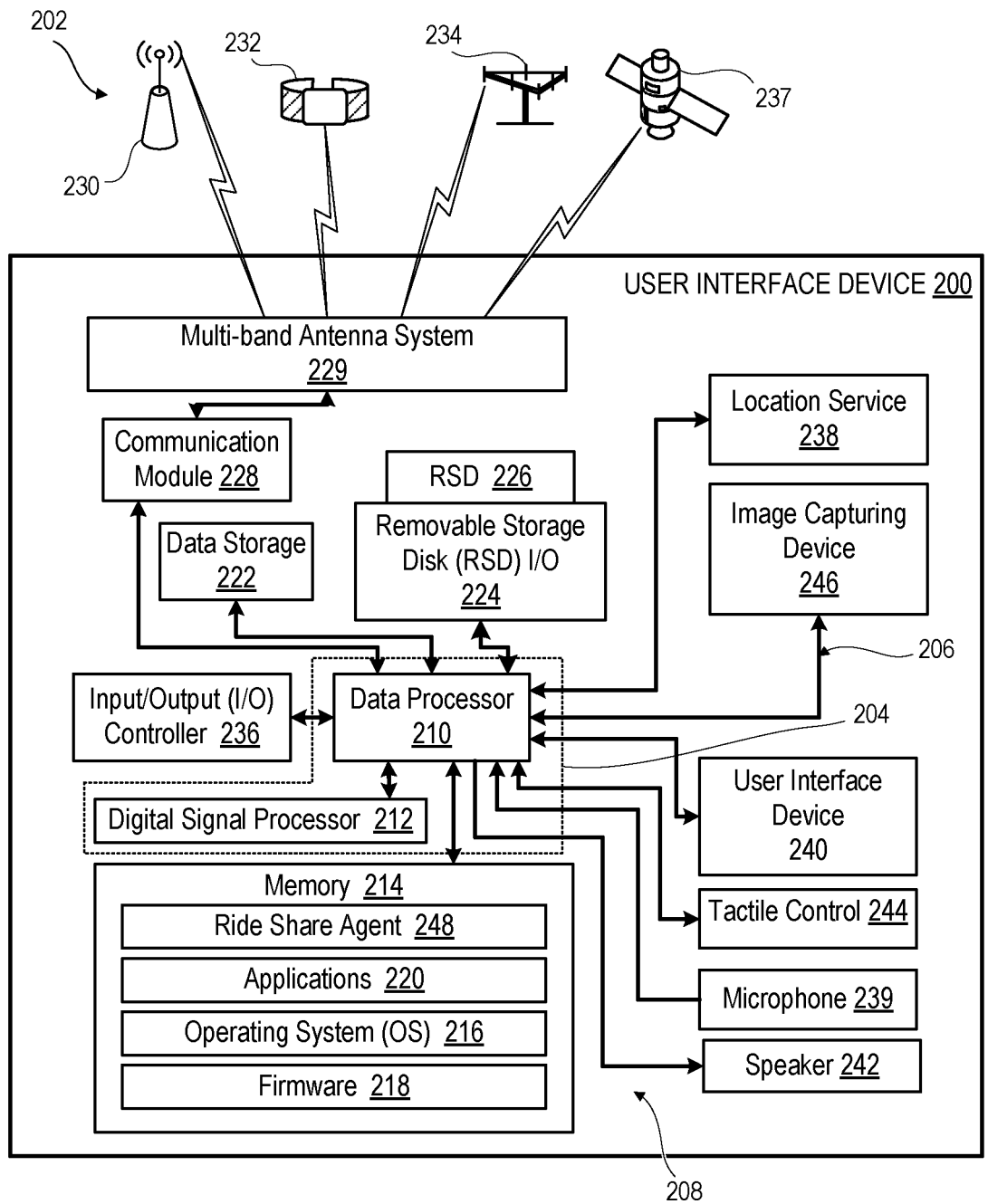
FIG. 2 is a functional block diagram of an exemplary user interface device used by a person to interact with the autonomous vehicle system of FIG. 1, according to one or more embodiments.

Turning now to FIG. 2, there is depicted a block diagram representation of an exemplary electronic device, and specifically user interface device 200, within which several of the features of the disclosure can be implemented. User interface device 200 is an exemplary implementation of user interface device 134 (FIG. 1). In an exemplary aspect, user interface device 200 includes the hardware and software to support various wireless or wired communication functions as part of a communication system 202. Referring now to the specific component makeup and the associated functionality of the presented components, processor subsystem 204 can be an integrated circuit (IC) that connects, via a plurality of bus interconnects 206, to a plurality of functional components 208 of user interface device 200. Processor subsystem 204 can include one or more programmable microprocessors, such as data processor 210 and digital signal processor (DSP) 212, which may both be integrated into a single processing device, in some embodiments. Processor subsystem 204 controls the communication, user interface, and other functions and/or operations of user interface device 200. These functions and/or operations thus include, but are not limited to, application data processing and signal processing. The user interface device 200 may use hardware component equivalents such as special purpose hardware, dedicated processors, general purpose computers, microprocessor-based computers, micro-controllers, optical computers, analog computers, dedicated processors and/or dedicated hard wired logic. Connected to processor subsystem 204 is memory 214, which can include volatile memory and/or non-volatile memory. Memory 214 stores software, such as operating system 216, as well as firmware 218. One or more other executable applications 220 can be stored within memory 214 for execution by processor subsystem 204. Memory 214 may be augmented by on-device data storage 222. Memory 214 can be further augmented by removable storage device (RSD) input/output (I/O) interface 224 that receives an RSD 226.

According to the illustrative embodiment, user interface device 200 supports wireless communication via a communication module 228 that transceives via a multi-band antenna system 229. For example, user interface device 200 may support communication protocols and transceiver radio frequencies appropriate for a wireless local area network (WLAN), represented by a node 230. The user interface device 200 can communicate over a personal access network (PAN) with devices such as a smart watch 232. The user interface device 200 can communicate with a radio access network (RAN) 234 that is part of a wireless wide area network (WWAN). In certain embodiments, user interface device 200 may also support a hardwired local access network (LAN) or peripheral devices via an input/output (I/O) controller 236. One or more of these networks, such as global positioning system (GPS) 237 can utilize or provide location services that communication with a location service component 238 of the user interface device 200.

User interface device 200 includes input and output devices. For example, microphone 239 receives user audible inputs. User interface device 240 can present visual or tactile outputs as well as receive user inputs. In one example, user interface device 240 can include a touch screen that is embedded within or associated with a display. An audio speaker 242 can augment or provide alternate presentation of the visual or tactile outputs of user interface device 240. A tactile control 244 can provide an interface such as for braille reading or manual inputs. An image capturing device 246 can receive gestures, facial features, and other image data. Additionally, while illustrated as a single system, it is to be understood that the user interface device 200 may be a distributed system, such as being at least a portion of the autonomous vehicle system 100 (FIG. 1). In one or more embodiments, user interface device 200 enables a range of informational, entertainment, and communication functions and personal productivity tools. A ride share agent 248 executed by user interface device 200 can data mine current or past activities triggered by a user of the user interface device 200 to identify the likelihood that a proposed ride share would be received favorably. For example, a user can have a pattern of visiting an area of a city that has a significant number of dining and social destinations on Friday and Saturday nights with one or more people that the user has identified as a social group of friends. Ride share agent 248 can initiate presentation of a socialized navigation map that is sized to include this area of town in response to the date and time and in response to associated people travelling to this area of town.

Figure 3:
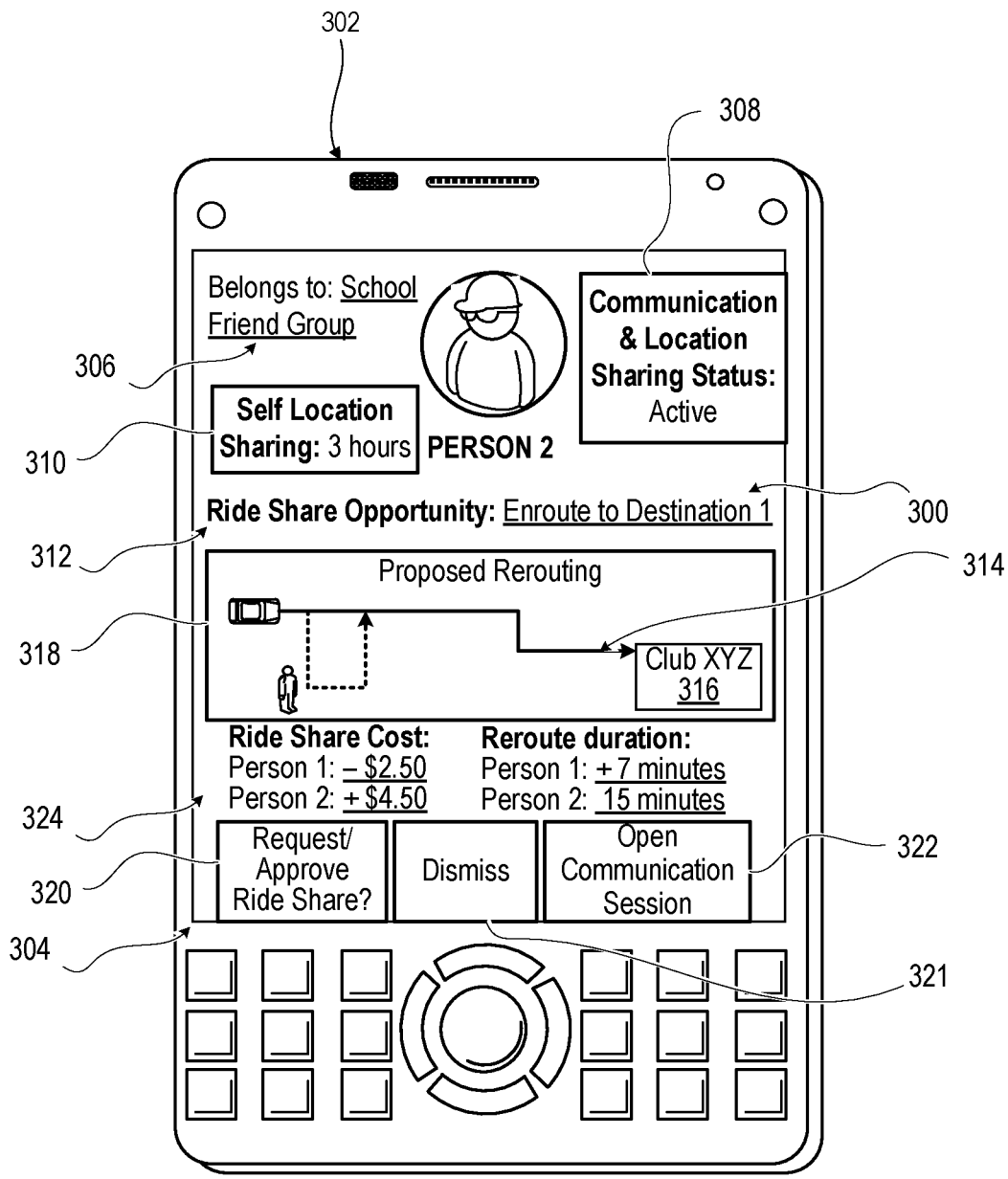
FIG. 3 is a front view of an exemplary user interface of a user interface device presenting an affordance to initiate or agree to a ride share, according to one or more embodiments.

FIG. 3 is a front view of an example user interface 300 of a user interface device 302 presenting an affordance 304 to initiate or agree to a ride share for a "person 2". User interface device 302 is an example application for user interface device 134 (FIG. 1) and user interface device 200 (FIG. 2). The affordance 304 provides an association indicator 306 for person 2, a communication and location sharing status 308, a temporal location sharing control 310, and designation 312 of the ride share opportunity. A route & proposed new route 314 to a destination 316 are presented on a proposed rerouting map 318. User input controls 320-322 respectively allow requesting or approving a ride share, dismissing the affordance, and opening a communication session with person 2. In one or more embodiments, a fare is calculated for each person, including information as to the change that would occur if the affordance of a ride share is accepted. Fare information 324 is displayed.

Figure 4:
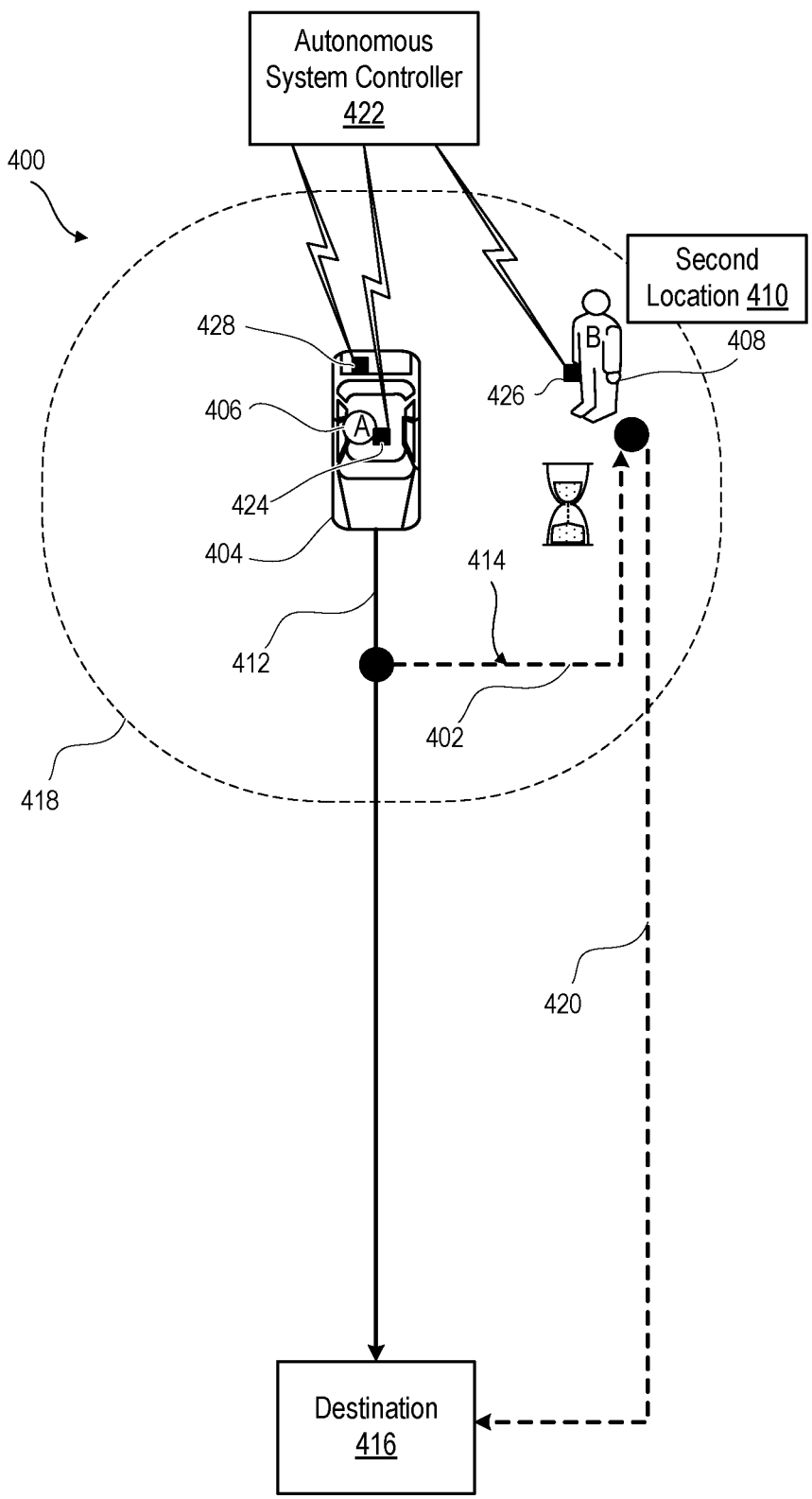
FIG. 4 is a top diagrammatic view illustrating a ride share scenario that includes backtracking to include a second person, according to one or more embodiments.

FIG. 4 is a top diagrammatic view illustrating an exemplary ride share scenario 400 that includes backtracking 402 by an autonomous vehicle 404 carrying a first person A 406 to include a second person B 408 at a second location 410. The autonomous vehicle 406 carrying the first person A 406 is shown to be at a first location. A first point-to-point route 412 is adjusted to a second route 414 for ride sharing to a destination 416 in response to the adjustment being within a proximity threshold 418 (e.g., the second location 410 at which the second person B 408 is located being within the proximity threshold 418). The proximity threshold 418 can be adjustable or dynamic. For example, a passenger can have an arrival deadline that constrains any excursions from the first point-to-point route 412. The threshold can be distance based or time based or both. The shared portion 420 of the second route 414 can then be optimized for time and distance.

For clarity, FIG. 4 illustrates an autonomous system controller 422 that communicates with: (i) autonomous vehicle 406; (ii) a first user interface device 424 either portably carried by first person A 406 or an HMI mounted in autonomous vehicle 406; and (iii) a second user interface device 426 portably carried by second person B 408. In one embodiment, autonomous system controller 422 is an implementation of administration system 122 (FIG. 1), performing fleet routing of more than one autonomous vehicles 406. A server-based information handling system (IHS) can execute an autonomous system controller 422 that is in communication with a population of autonomous vehicles 406 and a population of user interface devices 424, 426.

In one embodiment, autonomous system controller 422 is an implementation of computing system 112 of autonomous vehicle 102 of FIG. 1, performing routing in response to peer-to-peer interactions with potential and current passengers. Autonomous vehicle 406 can perform routing solely for the benefit of first person A 406. Second person B 408 can interact with an onboard controller 428 of autonomous vehicle 406 via second user interface device 426. In one embodiment, autonomous system controller 422 is an implementation of a distributed system having certain functions performed at a fleet level, other functions performed at an individual vehicle level, and other interface functions performed in user interface devices.

Figure 5:
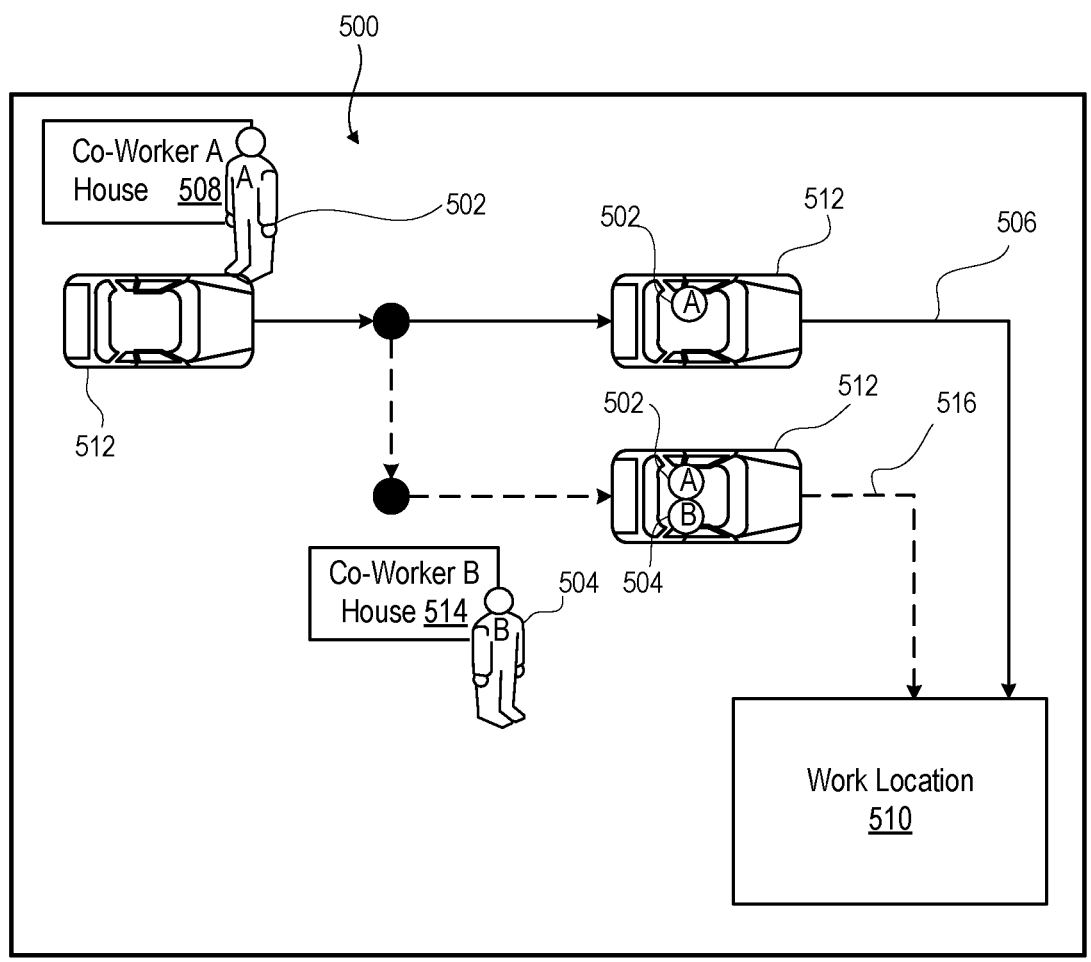
FIG. 5 is a top diagrammatic view illustrating a ride share scenario that includes associating co-workers as an opportunity to reroute for a ride share, according to one or more embodiments.

FIG. 5 is a top diagrammatic view illustrating a ride share scenario 500 that includes associating co-workers 502, 504 in advance of performing a work carpool. A first route 506 takes the first co-worker 504 from a coworker A house 508 to a work location 510. The autonomous vehicle 512 can be redirected to a co-worker B house 514 to include co-worker 504 in a ride share to the work location 510 along a second route 516, in this instance without a distance penalty.

Figure 6:
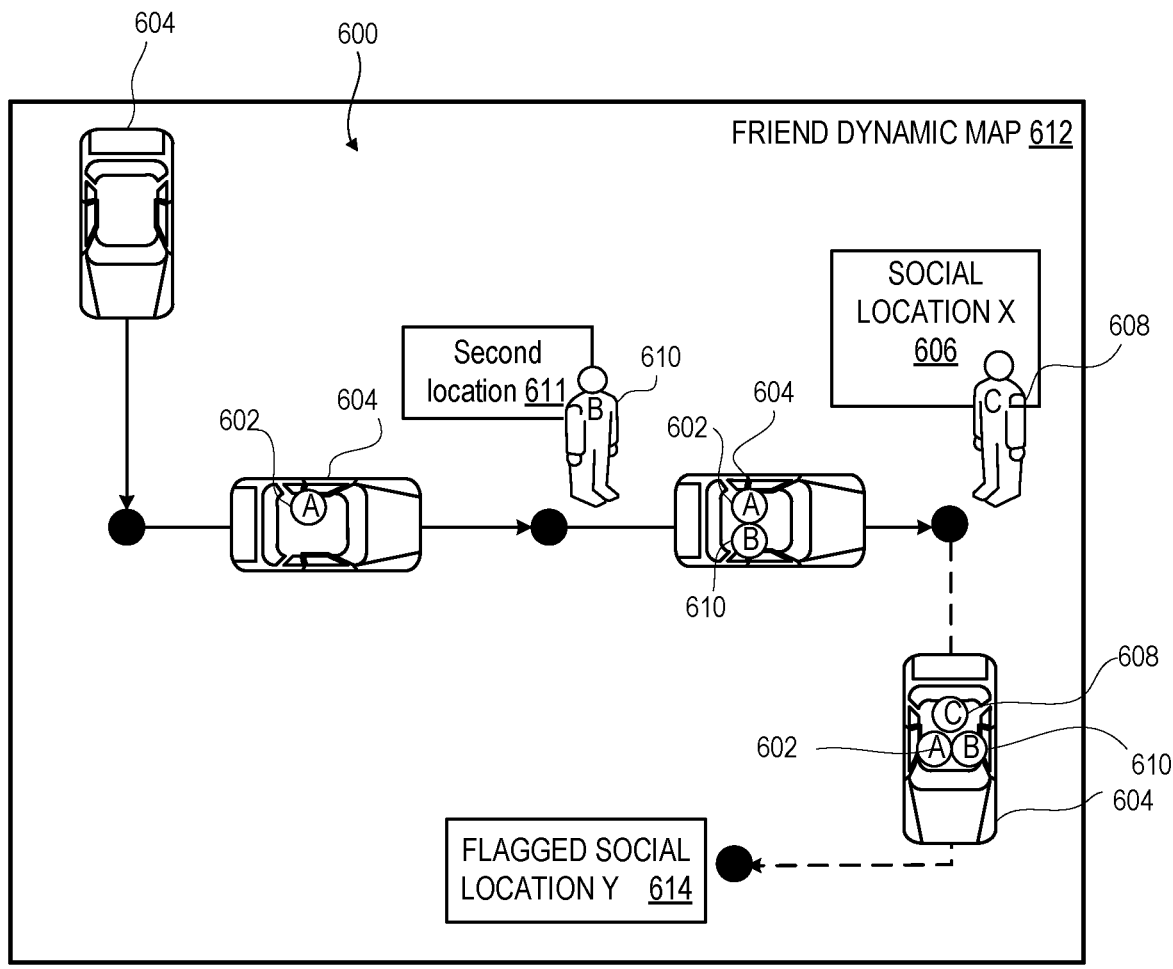
FIG. 6 is a top diagrammatic view illustrating a ride share scenario that includes associating identified friends or social group members to afford an opportunity to reroute for a ride share, according to one or more embodiments.

FIG. 6 is a top diagrammatic view illustrating a ride share scenario 600 that includes associating identified friends or social group members to afford an opportunity to reroute for a ride share. A first person "A" 602 is riding in an autonomous vehicle 604 to a destination such as a social location X 606. This destination could be selected based on seeing that another person "C" 608 is already at the social location X 606. A second person "B" 610 at a second location 611 can note this activity on a friend dynamic map 612 and utilize an autonomous vehicle system to request a ride share from the first person "A" 602. Enroute, first person A 602 and second person B 610 can note a flagged social location Y 614 that someone in the friend group has tagged as being a good destination. The autonomous vehicle system is utilized to reroute autonomous vehicle 604 to include the other person 608 in a ride share to flagged social location Y 614.

In one or more embodiment, an autonomous system controller 422 of FIG. 4 identifies an opportunity for proposing a ride share based on second person B 610 being merely associated with first person A 602 and may want to ride along in autonomous vehicle 604. For another example, association with a destination may be based on an associated person, such as the other person C 608 already being at the destination. For an additional example, the second person B 610 can be individually associated with the flagged social location Y 614. This location is proximate to a destination selected by the first person A 602, which indirectly associates with the second person B 610 as being conveniently on the way to a preferred destination.

Figure 7A:
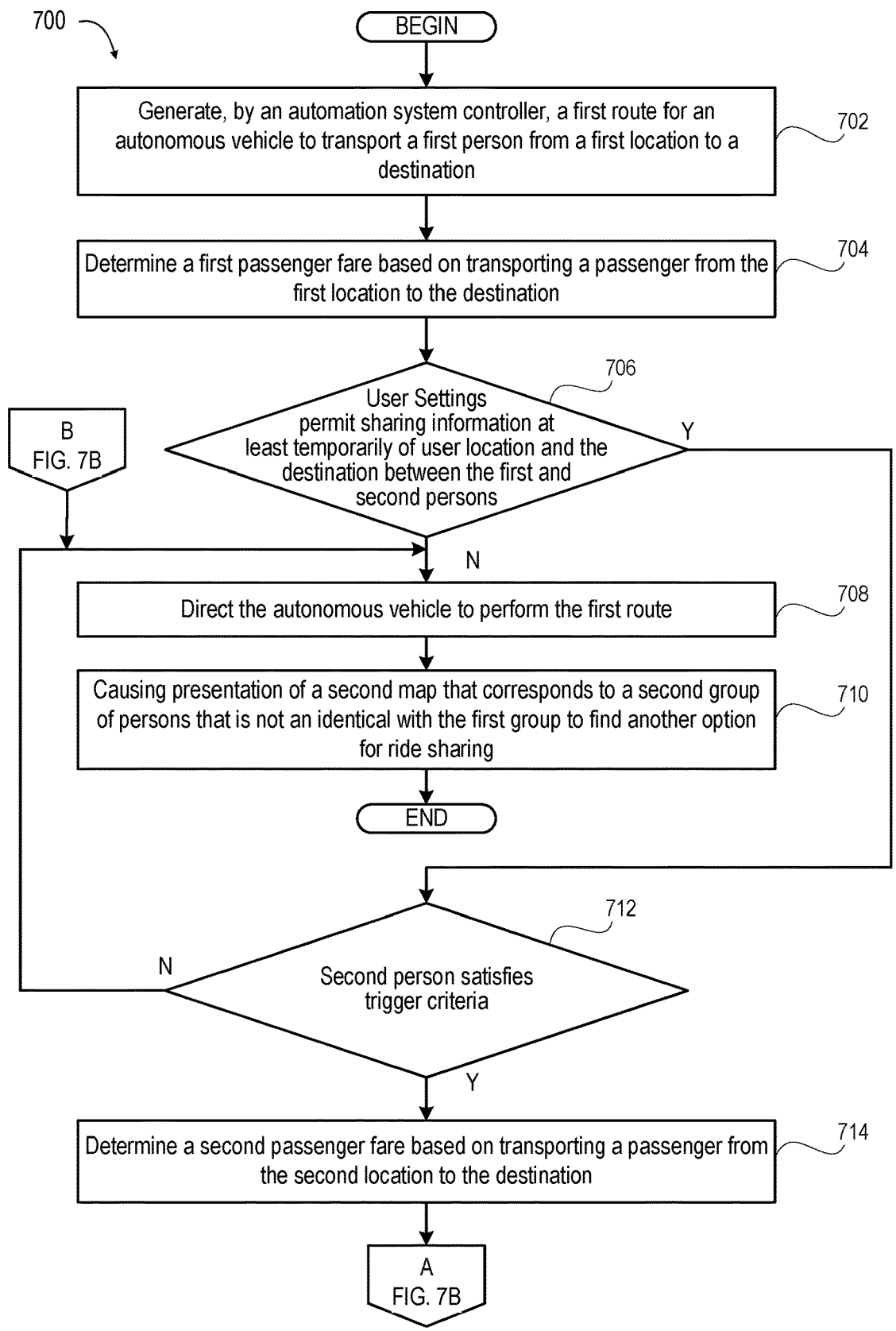
FIGS. 7A-B depict a flow diagram illustrating an exemplary methodology for facilitating a socialized ride share, according to one or more embodiments.
Figure 7B:
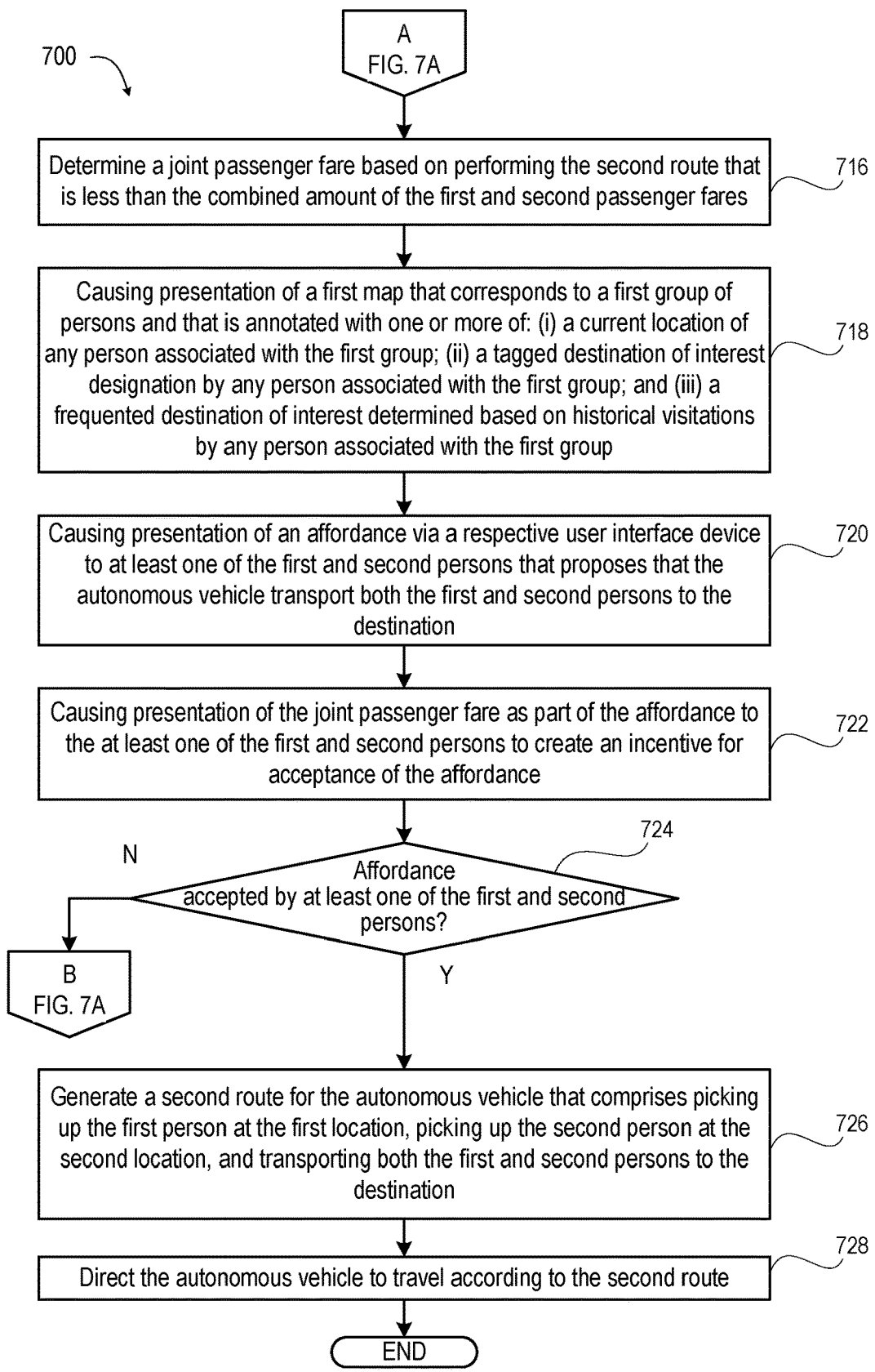

FIGS. 7A-7B illustrate an exemplary methodology relating to controlling a ride share provide by an autonomous vehicle. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIGS. 7A-B depicts a flow diagram illustrating a method 700 for automatically facilitating a ride share by an autonomous vehicle. In one or more embodiments, method 700 begins generating, by an autonomous system controller, a first route for an autonomous vehicle to transport a first person from a first location to a destination (block 702). Method 700 includes determining a first passenger fare based on transporting a passenger from the first location to the destination (block 704). Method 700 includes determining that respective user settings permit sharing information at least temporarily of user location and the destination between the first and second persons (decision block 706). In response to determining that user settings do not permit sharing information, method 700 includes directing the autonomous vehicle to perform the first route (block 708). In one or more embodiments, in response to a group selection trigger event, method 700 includes causing presentation of a second map that corresponds to a second group of persons that is not an identical with the first group to find another option for ride sharing (block 710). Then method 700 ends.

In response to determining that user settings permit sharing information in decision block 706, a further determination is made as to determining whether a second person satisfies trigger criteria comprising: (i) being at a second location that is within a proximity threshold to the first route; (ii) being associated with the first person; and (iii) being associated with the destination (decision block 712). A destination can be associated with both persons due to a shared historical visitation to the location, a user selection of the destination as recommended by a trusted person within the group, or the destination is along the way to another destination that is preferred by the particular person.

In one or more embodiments, the determination is made based on at least one of an association between the first and second persons based on at least one of: (i) a common employer email domain; (ii) common organizational membership; and (iii) user identified friends. In response to determining that the trigger criteria are not satisfied in decision block 712, method 700 returns to block 708 to continue directing the autonomous vehicle to perform the first route. In response to determining that the trigger criteria are satisfied in decision block 712, method 700 includes determining a second passenger fare based on transporting a passenger from the second location to the destination (block 714). Method 700 includes determining a joint passenger fare based on performing the second route that is less than the combined amount of the first and second passenger fares (block 716). Method 700 includes causing presentation of a first map that corresponds to a first group of persons and that is annotated with one or more of: (i) a current location of any person associated with the first group; (ii) a tagged destination of interest designation by any person associated with the first group; and (iii) a frequented destination of interest determined based on historical visitations by any person associated with the first group (block 718). Method 700 includes causing presentation of an affordance via a respective user interface device to at least one of the first and second persons that proposes that the autonomous vehicle transport both the first and second persons to the destination (block 720). Method 700 includes causing presentation of the joint passenger fare as part of the affordance to the at least one of the first and second persons to create an incentive for acceptance of the affordance (block 722). A determination is made as to whether the affordance is accepted by at least one of the first and second persons (decision block 724). In an exemplary embodiment, agreement is required by both parties. In response to determining that the affordance is not accepted by at least one of the first and second persons, method 700 returns to block 708 to direct the autonomous vehicle to perform the first route.

In response to receiving acceptance of the affordance from the at least one of the first and second persons via the respective user interface device, method 700 includes generating a second route for the autonomous vehicle that comprises picking up the first person at the first location, picking up the second person at the second location, and transporting both the first and second persons to the destination (block 726). Method 700 includes directing the autonomous vehicle to travel according to the second route (block 728). Then method 700 ends.

For clarity, a single destination for both of the first and second persons is described. In one or more embodiments, the method 700 includes associating two or more candidates for a ride share wherein the candidates originate at one or more locations and wherein the candidates are designated to go to one or more destinations with a shared transportation path during at least a portion of the second route.

In one or more embodiments, an autonomous vehicle system can determine that a population of autonomous vehicles is insufficient to service current demand of passengers. Ride sharing can be made a mandatory feature of the service. For example, an employer may contract with an autonomous vehicle service to assist employees in obtaining transportation to and from work. The autonomous vehicle system can look for rerouting opportunities to maximize delivery of employees at the appropriate start and end times.

In one or more embodiments, an autonomous vehicle system can enable candidates to identify social opportunities to share experiences with friends, club members, etc. Opportunities for a person to go to a destination with an associated person can be presented to either or both persons with any subsequent ride share requiring mutual acceptance. In one or more embodiments, the persons perform a person-to-person communication session as part of making an informed decision to accept a ride share. The communication session can be facilitated by the autonomous vehicle system. In other embodiments, each person interacts only with the autonomous vehicle system in viewing and accepting the ride share opportunity.

Figure 8:
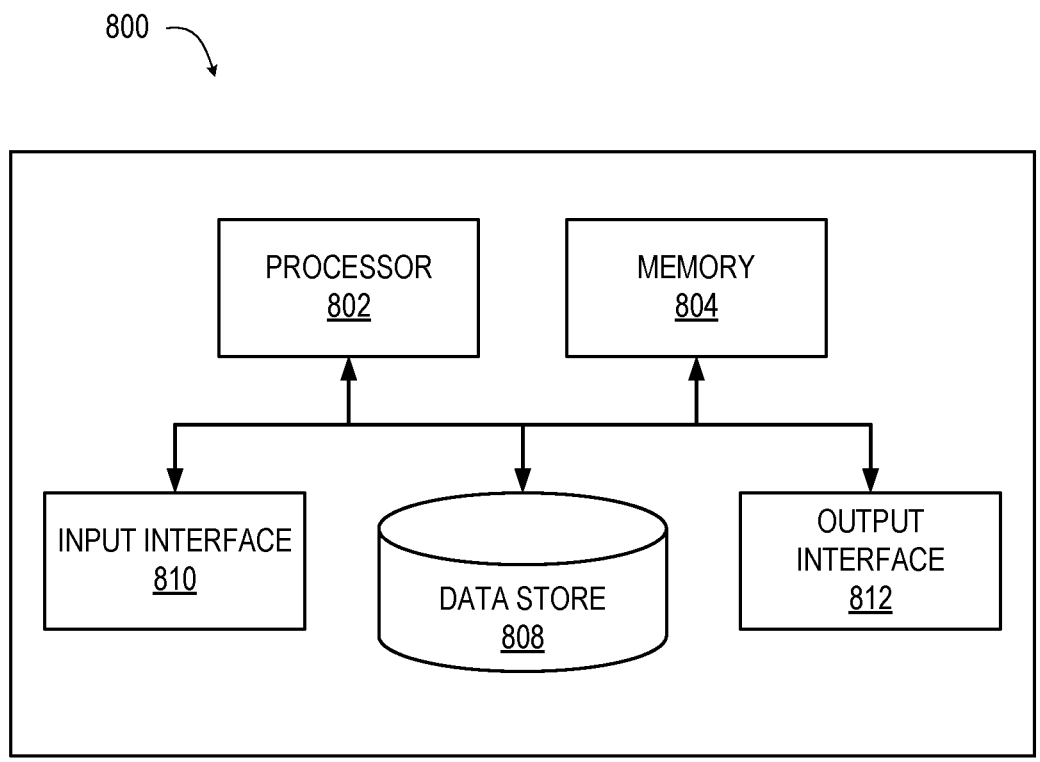
FIG. 8 illustrates an exemplary computing device, according to one or more embodiments.

Referring now to FIG. 8, a high-level illustration of an exemplary computing device 800 that can be used in accordance with the systems and methodologies disclosed herein is illustrated. For instance, the computing device 800 may be or include the computing system 112 of the autonomous vehicle 102. According to another example, the administration system 122 of FIG. 1 can be or include the computing device 800. Pursuant to a further example, computing device 800 can be or include the user interface device 134, the user interface device 200, or the user interface device 302. The computing device 800 includes at least one processor 802 (e.g., the processor 114, the processor subsystem 204) that executes instructions that are stored in a memory 804 (e.g., the memory 116, the memory 214). The instructions may be, for instance, instructions for implementing functionality described as being carried out by one or more systems discussed above or instructions for implementing one or more of the methods described above. The processor 802 may be a GPU, a plurality of GPUs, a CPU, a plurality of CPUs, a multi-core processor, etc. The processor 802 may access the memory 804 by way of a system bus 806.

The computing device 800 additionally includes a data store 808 that is accessible by the processor 802 by way of the system bus 806. The computing device 800 also includes an input interface 810 that allows external devices to communicate with the computing device 800. For instance, the input interface 810 may be used to receive instructions from an external computer device, etc. The computing device 800 also includes an output interface 812 that interfaces the computing device 800 with one or more external devices. For example, the computing device 800 may transmit control signals to the vehicle propulsion system 106, the braking system 108, and/or the steering system 110 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
generating a first route for an autonomous vehicle to transport a first person from a first location to a destination;
causing the autonomous vehicle to pick up the first person at the first location and transport the first person along the first route towards the destination;
determining that a second person satisfies trigger criteria, the trigger criteria comprising:
the second person being at a second location that is within a proximity threshold to the first route; and
the second person being associated with the first person;
while the autonomous vehicle transports the first person along the first route and in response to determining that the trigger criteria are satisfied by the second person, causing an affordance to be presented via a user interface device to the second person that proposes that the autonomous vehicle transport both the first and second persons to the destination;
in response at least in part to receiving acceptance of the affordance from the second person via the user interface device, generating a second route for the autonomous vehicle to transport both the first and second persons to the destination; and
causing the autonomous vehicle to change from following the first route to following the second route towards the destination such that the autonomous vehicle is caused to pick up the second person at the second location and transport both the first and second persons from the second location along the second route towards the destination.

2. The method of claim 1, further comprising:
determining a first passenger fare based on transporting a passenger from the first location to the destination;
determining a second passenger fare based on transporting a passenger from the second location to the destination;
determining a joint passenger fare based on performing the second route, the joint passenger fare being less than a combined amount of the first and second passenger fares; and
causing the joint passenger fare to be presented as part of the affordance to the second person.

3. The method of claim 1, further comprising:
determining that sharing of information specifying a user location and the destination is permitted between the first and second persons by way of affordances presented via respective user interface devices;
wherein whether the second person satisfies the trigger criteria is determined in response to determining that the sharing of the information is permitted.

4. The method of claim 1, further comprising determining an association between the first and second persons based on at least one of: (i) a common employer email domain; (ii) common organizational membership; or (iii) user identified friends.

5. The method of claim 1, wherein causing the affordance to be presented comprises causing presentation of a first map via the user interface device, the first map corresponds to a first group of persons and is annotated with one or more of: (i) a current location of any person associated with the first group; (ii) a tagged destination of interest designation by any person associated with the first group; or (iii) a frequented destination of interest determined based on historical visitations by any person associated with the first group.

6. The method of claim 5, further comprising, in response to a group selection trigger event, causing presentation of a second map via the user interface device, the second map corresponds to a second group of persons that is not identical with the first group.

7. The method of claim 5, wherein annotating the first map with the current location of a particular person associated with the first group is in response to determining whether the particular person has temporally enabled location sharing.

8. The method of claim 1, wherein the autonomous vehicle is further caused to drop off the second person at a location that differs from and is proximate to a location at which the first person is dropped off.

9. The method of claim 1, further comprising:
while the autonomous vehicle transports the first person along the first route and in response to determining that the trigger criteria are satisfied by the second person, causing a second affordance to be presented via a differing user interface device to the first person that proposes that the autonomous vehicle transport both the first and the second persons to the destination;
wherein the second route for the autonomous vehicle is further generated in response to receiving acceptance of the second affordance from the first person via the differing user interface device.

10. An autonomous system controller comprising:
a communication interface that is communication with an autonomous vehicle, a first user interface device that is used by a first person, and a second user interface device that is used by a second person;
at least one processor; and
memory that comprises computer-executable instructions that, when executed by the at least one processor, cause the at least one processor to perform acts comprising:
generating a first route for the autonomous vehicle to transport the first person from a first location to a destination;
causing the autonomous vehicle to transport the first person along the first route from the first location towards the destination;
determining that the second person satisfies trigger criteria, the trigger criteria comprising:
the second person being at a second location that is within a proximity threshold to the first route; and
the second person being associated with the first person;
while the autonomous vehicle transports the first person along the first route and in response to determining that the trigger criteria are satisfied by the second person, causing an affordance to be presented via the first user interface device to the first person that proposes that the autonomous vehicle transport both the first and second persons to the destination;
in response at least in part to receiving acceptance of the affordance from the first person via the first user interface device, generating a second route for the autonomous vehicle to transport both the first and second persons to the destination; and
causing the autonomous vehicle to change from following the first route to following the second route towards the destination such that the autonomous vehicle is caused to pick up the second person at the second location and transport both the first and second persons from the second location along the second route towards the destination.

11. The autonomous system controller of claim 10, the acts further comprising:
determining a first passenger fare based on transporting a passenger from the first location to the destination;
determining a second passenger fare based on transporting a passenger from the second location to the destination;
determining a joint passenger fare based on performing the second route, the joint passenger fare being less than a combined amount of the first and second passenger fares; and
causing the joint passenger fare to be presented as part of the affordance to the first person.

12. The autonomous system controller of claim 10, the acts further comprising:
determining that sharing of information specifying a user location and the destination is permitted between the first and second persons by way of affordances presented via the first user interface device and the second user interface device;
wherein whether the second person satisfies the trigger criteria is determined in response to determining that the sharing of the information is permitted.

13. The autonomous system controller of claim 10, the acts further comprising:
determining an association between the first and second persons based on at least one of: (i) a common employer email domain; (ii) common organizational membership; or (iii) user identified friends.

14. The autonomous system controller of claim 10, wherein causing the affordance to be presented further comprises causing presentation of a first map via the first user interface device, the first map corresponds to a first group of persons and is annotated with one or more of: (i) a current location of any person associated with the first group; (ii) a tagged destination of interest designation by any person associated with the first group; or (iii) a frequented destination of interest determined based on historical visitations by any person associated with the first group.

15. The autonomous system controller of claim 14, the acts further comprising:
in response to a group selection trigger event, presenting a second map via the first user interface device, the second map corresponds to a second group of persons that is not identical with the first group.

16. The autonomous system controller of claim 14, wherein the first map is annotated with the current location of a particular person associated with the first group in response to determining whether the particular person has temporally enabled location sharing.

17. The autonomous system controller of claim 10, wherein the autonomous vehicle comprises the first user interface device that is used by the first person to receive the affordance when being transported on the first route.

18. The autonomous system controller of claim 10, wherein the autonomous vehicle is further caused to drop off the second person at a location that differs from and is proximate to a location at which the first person is dropped off.

19. The autonomous system controller of claim 10, the acts further comprising:
while the autonomous vehicle transports the first person along the first route and in response to determining that the trigger criteria are satisfied by the second person, causing a second affordance to be presented via the second user interface device to the second person that proposes that the autonomous vehicle transport both the first and the second persons to the destination;
wherein the second route for the autonomous vehicle is further generated in response to receiving acceptance of the second affordance from the second person via the second user interface device.

20. A computer system comprising:
at least one processor; and
memory that comprises computer-executable instructions that, when executed by the at least one processor, cause the at least one processor to perform acts comprising:
generating a first route for an autonomous vehicle to transport a first person from a first location to a destination;
causing the autonomous vehicle to transport the first person along the first route from the first location towards the destination;
determining that a second person satisfies trigger criteria, the trigger criteria comprising:
the second person being at a second location that is within a proximity threshold to the first route;
the second person being associated with the first person; and
the second person being associated with the destination;

while the autonomous vehicle transports the first person along the first route and in response to determining that the trigger criteria are satisfied by the second person;
   causing a first affordance to be presented via a first user interface device to the first person that proposes that the autonomous vehicle transport both the first and second persons to the destination; and
   causing a second affordance to be presented via a second user interface device to the second person that proposes that the autonomous vehicle transport both the first and second persons to the destination;
in response to receiving acceptance of the first affordance from the first person via the first user interface device and acceptance of the second affordance from the second persons via the second user interface device, generating a second route for the autonomous vehicle to transport both the first and second persons to the destination; and
causing the autonomous vehicle to change from following the first route to following the second route towards the destination such that the autonomous vehicle is caused to pick up the second person at the second location and transport both the first and second persons from the second location along the second route towards the destination.

* * * * *